United States Patent
Wang et al.

(10) Patent No.: US 9,024,539 B2
(45) Date of Patent: May 5, 2015

(54) PFC LED DRIVER CAPABLE OF REDUCING FLICKER

(71) Applicant: Immense Advance Technology Corp., New Taipei (TW)

(72) Inventors: Yen-Hui Wang, New Taipei (TW); Yu-Wen Chang, New Taipei (TW)

(73) Assignee: Immense Advance Technology Corp., New Taipei (TW)

( * ) Notice: Subject to any disclaimer, the term of this patent is extended or adjusted under 35 U.S.C. 154(b) by 344 days.

(21) Appl. No.: 13/628,449

(22) Filed: Sep. 27, 2012

(65) Prior Publication Data

US 2014/0084798 A1    Mar. 27, 2014

(51) Int. Cl.
*G05F 1/00* (2006.01)
*H05B 33/08* (2006.01)

(52) U.S. Cl.
CPC .......... *H05B 33/0812* (2013.01); *H05B 33/089* (2013.01); *Y02B 20/345* (2013.01); *Y02B 20/348* (2013.01)

(58) Field of Classification Search
USPC .................. 315/224, 247, 276, 291, 307, 310
See application file for complete search history.

(56) References Cited

U.S. PATENT DOCUMENTS

2012/0286696 A1*  11/2012  Ghanem ........................ 315/291

* cited by examiner

*Primary Examiner* — Douglas W Owens
*Assistant Examiner* — Jianzi Chen
(74) *Attorney, Agent, or Firm* — Ming Chow; Sinorica, LLC

(57) ABSTRACT

A PFC LED driver capable of reducing flicker, including: a bridge rectifier, used to generate a full-wave-rectified line input voltage according to an AC power a single stage PFC constant average current converter, coupled with the bridge rectifier and used for forcing an input current to track the full-wave-rectified line input voltage and regulating an average value of an output current at a first preset value; and a peak current regulator, in series with an LED module to form a load for the output current to flow through, wherein the peak current regulator is used to regulate a peak of the output current at a second preset value, and the second preset value is higher than the first preset value.

6 Claims, 5 Drawing Sheets

US 9,024,539 B2

PFC LED DRIVER CAPABLE OF REDUCING FLICKER

BACKGROUND OF THE INVENTION

1. Field of the Invention

The present invention relates to a PFC (power factor correction) LED (light emitting diode) driver, especially to a PFC LED driver capable of reducing flicker.

2. Description of the Related Art

In present LED lighting applications, LED drivers are generally required to provide a PFC (power factor correction) function, that is, to make an input current in phase with a full-wave-rectified line input voltage. However, an output current flowing through an LED module will thereby tend to have a large current ripple, which causes an annoying flicker phenomenon and degrades luminous efficiency.

To reduce the current ripple of an LED current, one solution is to utilize a two-stage PFC architecture. Please refer to FIG. 1, which illustrates a block diagram of a prior art LED driver having a two-stage PFC architecture. As illustrated in FIG. 1, the prior art LED driver includes a bridge rectifier 110, a PFC converter 120, a bulk capacitor 130, and a PWM converter 140, and an LED module 150 is driven by the prior art LED driver.

The bridge rectifier 110 is used to generate a full-wave-rectified line input voltage $V_{IN}$ according to an AC power $V_{AC}$.

The PFC converter 120 is used to force an input current $I_{IN}$ to track the full-wave-rectified line input voltage $V_{IN}$ to achieve power factor correction, and at the same time provide a loosely regulated DC voltage $V_B$ on the bulk capacitor 130.

The PWM converter 140, of which the operation is independent of that of the PFC converter 120, is used to convert the loosely regulated DC voltage $V_B$ to a DC current $I_{OUT}$ to drive the LED module 150.

Although the two-stage PFC architecture is capable of providing a required power factor and reducing the current ripple of an output current, and thereby the flicker, for an LED module, it has the disadvantages of being expensive and bulky.

Another solution is to utilize a single stage PFC constant average current converter to drive an LED module with a very large capacitor in parallel with the LED module. The single stage PFC constant average current converter is responsible for forcing an input current to track a full-wave-rectified line input voltage and regulating the average value of an output current at a preset value for the LED module, and the very large capacitor is responsible for reducing the current ripple of the output current. However, the very large capacitor is bulky and its performance on ripple reduction is still not good enough.

To solve the foregoing problems, a novel PFC LED driver is needed.

SUMMARY OF THE INVENTION

One objective of the present invention is to disclose a PFC LED driver capable of reducing the current ripple of LEDs to prevent a flicker phenomenon.

Another objective of the present invention is to disclose a PFC LED driver capable of reducing the current ripple of LEDs to improve the luminous efficiency without compromising the power factor.

Another objective of the present invention is to disclose a PFC LED driver capable of reducing flicker, which can be implemented with a low cost and a small size.

Still another objective of the present invention is to disclose a PFC LED driver capable of reducing flicker, which is easy to design.

To attain the foregoing objectives, a PFC LED driver capable of reducing flicker is proposed, including:

a bridge rectifier, used to generate a full-wave-rectified line input voltage according to an AC power;

a single stage PFC constant average current converter, coupled with the bridge rectifier and used for forcing an input current to track the full-wave-rectified line input voltage and regulating an average value of an output current at a first preset value; and a peak current regulator, in series with an LED module to form a load for the output current to flow through, wherein the peak current regulator is used to regulate a peak of the output current at a second preset value, and the second preset value is higher than the first preset value.

In one embodiment, the peak current regulator includes:

a peak current setting unit, having an output end to provide a clamping current for setting the second preset value;

a first NMOS transistor, having a first gate, a first drain, and a first source, the first gate and first drain being coupled to the output end of the peak current setting unit, and the first source being coupled to a current output node, wherein the current output node is used for the output current to flow out of the peak current regulator; and a second NMOS transistor, having a second gate, a second drain, and a second source, the second gate being coupled to the first gate of the first NMOS transistor, the second drain being coupled to a current input node, and the second source is coupled to the current output node, wherein the current input node is used for the output current to flow into the peak current regulator.

In one embodiment, the peak current regulator includes:

a peak current setting unit, having an output end to provide a clamping voltage for setting the second preset value;

an amplifier, having a positive input end, a negative input end, and an output end, the positive input end being coupled to the output end of the peak current setting unit;

an NMOS transistor, having a gate, a drain, and a source, the gate being coupled to the output end of the amplifier, the drain being coupled to a current input node, and the source being coupled to the negative input end of the amplifier, wherein the current input node is used for the output current to flow into the peak current regulator; and a current sensing resistor, having one end coupled to the source of the NMOS transistor, and another end coupled to a current output node, wherein the current output node is used for the output current to flow out of the peak current regulator.

In one embodiment, the peak current regulator includes:

a peak current setting unit, having an output end to provide a clamping current for setting the second preset value;

a first PMOS transistor, having a first gate, a first drain, and a first source, the first gate and first drain being coupled to the output end of the peak current setting unit, and the first source being coupled to a current input node, wherein the current input node is used for the output current to flow into the peak current regulator; and a second PMOS transistor, having a second gate, a second drain, and a second source the second gate being coupled to the first gate of the first PMOS transistor, the second drain being coupled to a current output node, and the second source being coupled to the current input node, wherein the current output node is used for the output current to flow out of the peak current regulator.

In one embodiment, the peak current regulator includes:

a peak current setting unit, having an output end to provide a clamping voltage for setting the second preset value;

an amplifier, having a positive input end, a negative input end, and an output end, the positive input end being coupled to the output end of the peak current setting unit;

a PMOS transistor, having a gate, a drain, and a source, the gate being coupled to the output end of the amplifier, the drain being coupled to a current output node, and the source being coupled to the negative input end of the amplifier, wherein the current output node is used for the output current to flow out of the peak current regulator; and a current sensing resistor, having one end coupled to the source of the PMOS transistor, and another end coupled to a current input node, wherein the current input node is used for the output current to flow into the peak current regulator.

In one embodiment, the single stage PFC constant average current converter is of a buck type.

In one embodiment, the single stage PFC constant average current converter is of a buck-boost type.

In one embodiment, the single stage PFC constant average current converter is of a fly-back type.

To attain the foregoing objectives, another PFC LED driver capable of reducing current ripple is proposed, including:

a bridge rectifier, used to generate a full-wave-rectified line input voltage according to an AC power;

a single stage PFC constant average current converter, coupled with the bridge rectifier and used for forcing an input current to track the full-wave-rectified line input voltage and regulating an average value of an output current at a first preset value; and a peak current regulator, in series with an LED module to form a load for the output current to flow through and used for regulating a peak of the output current at a second preset value, the peak current regulator comprising:

a peak current setting unit, having an output end to provide a clamping current for setting the second preset value;

a first NMOS transistor, having a first gate, a first drain, and a first source, the first gate and first drain being coupled to the output end of the peak current setting unit, and the first source being coupled to a current output node, wherein the current output node is used for the output current to flow out of the peak current regulator; and a second NMOS transistor, having a second gate, a second drain, and a second source, the second gate being coupled to the first gate of the first NMOS transistor, the second drain being coupled to a current input node, and the second source is coupled to the current output node, wherein the current input node is used for the output current to flow into the peak current regulator.

To attain the foregoing objectives, still another PFC LED driver capable of reducing current ripple is proposed, including:

a bridge rectifier, used to generate a full-wave-rectified line input voltage according to an AC power;

a single stage PFC constant average current converter, coupled with the bridge rectifier and used for forcing an input current to track the full-wave-rectified line input voltage and regulating an average value of an output current at a first preset value; and a peak current regulator, in series with an LED module to form a load for the output current to flow through and used for regulating a peak of the output current at a second preset value, the peak current regulator comprising:

a peak current setting unit, having an output end to provide a clamping voltage for setting the second preset value;

an amplifier, having a positive input end, a negative input end, and an output end, the positive input end being coupled to the output end of the peak current setting unit;

an NMOS transistor, having a gate, a drain, and a source, the gate being coupled to the output end of the amplifier, the drain being coupled to a current input node, and the source being coupled to the negative input end of the amplifier, wherein the current input node is used for the output current to flow into the peak current regulator; and a current sensing resistor, having one end coupled to the source of the NMOS transistor, and another end coupled to a current output node, wherein the current output node is used for the output current to flow out of the peak current regulator.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
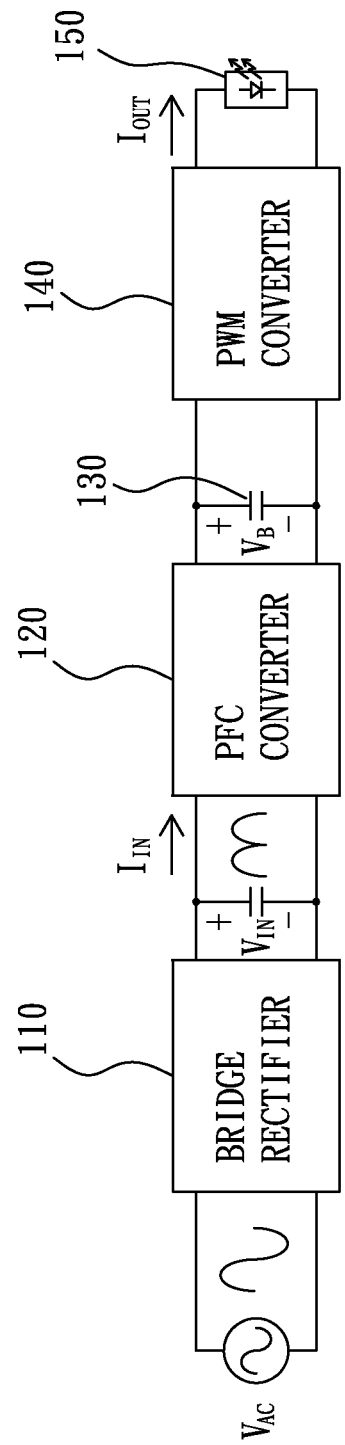
FIG. 1 illustrates a block diagram of a prior art LED driver having a two-stage PFC architecture.
Figure 2:
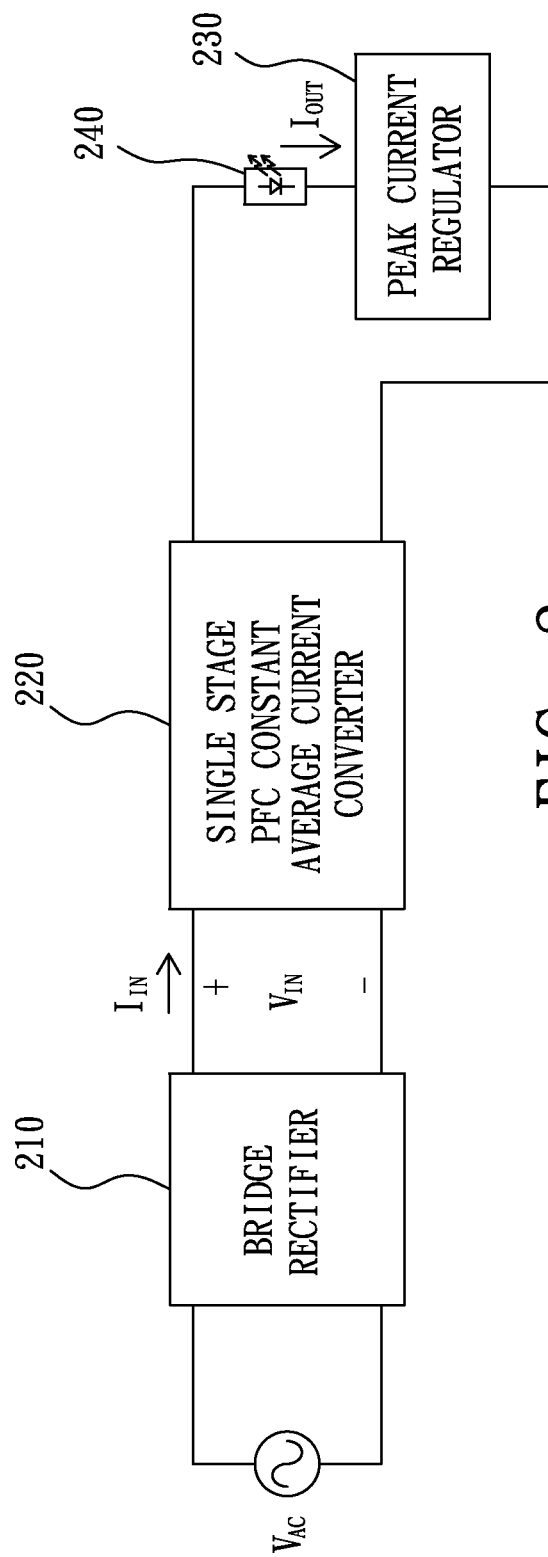
FIG. 2 illustrates a block diagram of a PFC LED driver capable of reducing flicker according to a preferred embodiment of the present invention.

Please refer to FIG. 2, which illustrates a block diagram of a PFC LED driver capable of reducing flicker according to a preferred embodiment of the present invention. As illustrated in FIG. 2, the PFC LED driver capable of reducing flicker includes a bridge rectifier 210, a single stage PFC constant average current converter 220, and a peak current regulator 230, and an LED module 240 is driven by the PFC LED driver.

The bridge rectifier 210 is used to generate a full-wave-rectified line input voltage $V_{IN}$ according to an AC power $V_{AC}$.

The single stage PFC constant average current converter 220, coupled with the bridge rectifier 210, is responsible for forcing an input current $I_{IN}$ to track the full-wave-rectified line input voltage $V_{IN}$ and regulating the average value of an output current $I_{OUT}$ at a first preset value. The single stage PFC constant average current converter 220 can be of a buck type, a buck-boost type, or a fly-back type.

The peak current regulator 230, at the low side of the LED module 240 and in series with the LED module 240 to form a load for the output current $I_{OUT}$ to flow through, is used to regulate a peak of the output current $I_{OUT}$ at a second preset value, which is higher than the first preset value, to reduce the current ripple of the output current $I_{OUT}$, and thereby reduce the flicker of the LED module 240. The principle is as follows:

When in operation, the single stage PFC constant average current converter 220 will force the input current $I_{IN}$ to be in phase with the full-wave-rectified line input voltage $V_{IN}$, and make the average value of the output current $I_{OUT}$ approach the first preset value. In the mean time, the peak current regulator 230 sets an upper bound at the second preset value to define a peak for the output current $I_{OUT}$. As the average value of the output current $I_{OUT}$ corresponds to a combination of the peak and the valley of the output current $I_{OUT}$, a corresponding valley value of the output current $I_{OUT}$ will be generated accordingly when the average value of the output current $I_{OUT}$ is regulated at the first preset value, and the peak of the output current $I_{OUT}$ is regulated at the second preset value. As a result, a ripple of the output current $I_{OUT}$ is determined by the difference of the first preset value and the second preset value. By properly setting the second preset value, an acceptable ripple of the output current $I_{OUT}$ can be obtained. For example, by letting the first preset value be equal to 350 mA and the second preset value be equal to 378 mA, the ripple will be around 28 mA. It is to be noted that the ripple of the output current $I_{OUT}$ averaging at 350 mA can be as large as 200 mA if no action is taken to curb the variation of the output current $I_{OUT}$ in a PFC LED driver.

Ideally, the ripple of the output current $I_{OUT}$ can be as small as zero, but as there will be variations during manufacturing processes, it is better to set a margin between the first preset value and the second preset value to absorb the variations. However, even if the second preset value should wrongly lie below the first preset value, the output current $I_{OUT}$ will only exhibit a DC line of the second preset value, and no damage will occur.

Figure 3:
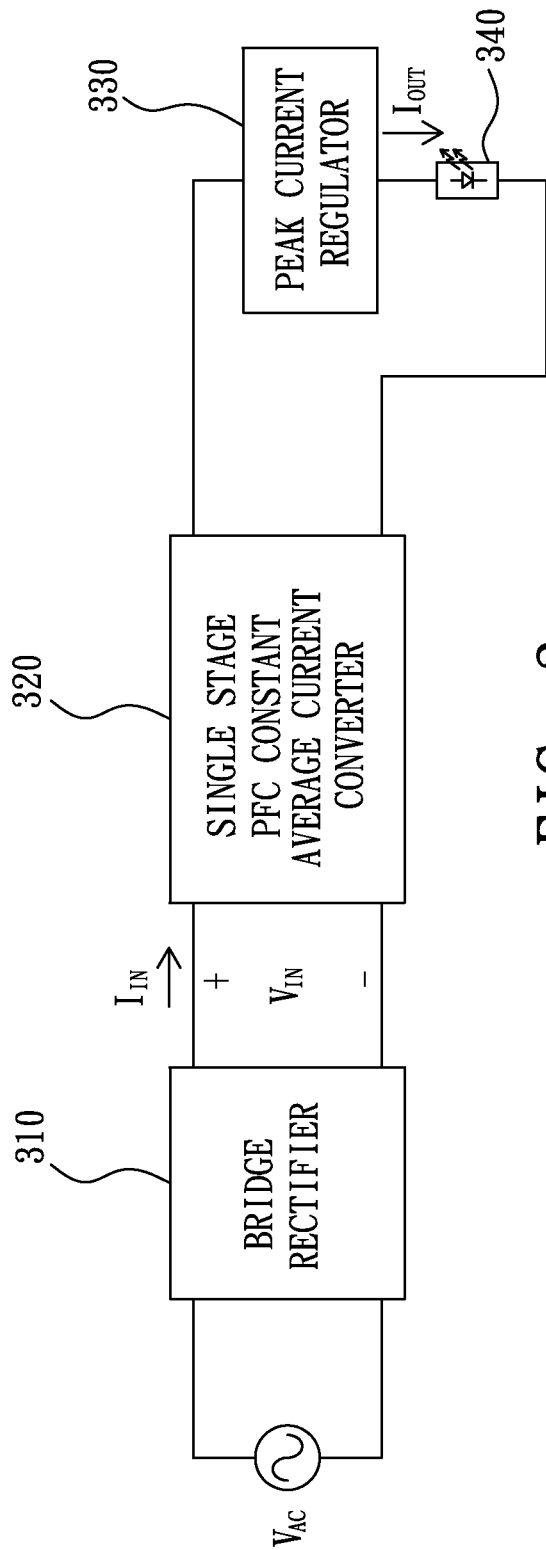
FIG. 3 illustrates a block diagram of a PFC LED driver capable of reducing flicker according to another preferred embodiment of the present invention.

FIG. 3 illustrates a block diagram of a PFC LED driver capable of reducing flicker according to another preferred embodiment of the present invention. As illustrated in FIG. 3, the PFC LED driver capable of reducing flicker includes a bridge rectifier 310, a single stage PFC constant average current converter 320, and a peak current regulator 330, and an LED module 340 is driven by the PFC LED driver.

The bridge rectifier 310 is used to generate a full-wave-rectified line input voltage $V_{IN}$ according to an AC power $V_{AC}$.

The single stage PFC constant average current converter 320, coupled with the bridge rectifier 310, is responsible for forcing an input current $I_{IN}$ to track the full-wave-rectified line input voltage $V_{IN}$ and regulating the average value of an output current $I_{OUT}$ at a first preset value. The single stage PFC constant average current converter 320 can be of a buck type, a buck-boost type, or a fly-back type.

The peak current regulator 330, at the high side of the LED module 340 and in series with the LED module 340 to form a load for the output current $I_{OUT}$ to flow through, is used to regulate a peak of the output current $I_{OUT}$ at a second preset value, which is higher than the first preset value, to reduce the current ripple of the output current $I_{OUT}$, and thereby reduce the flicker of the LED module 340.

Figure 4:
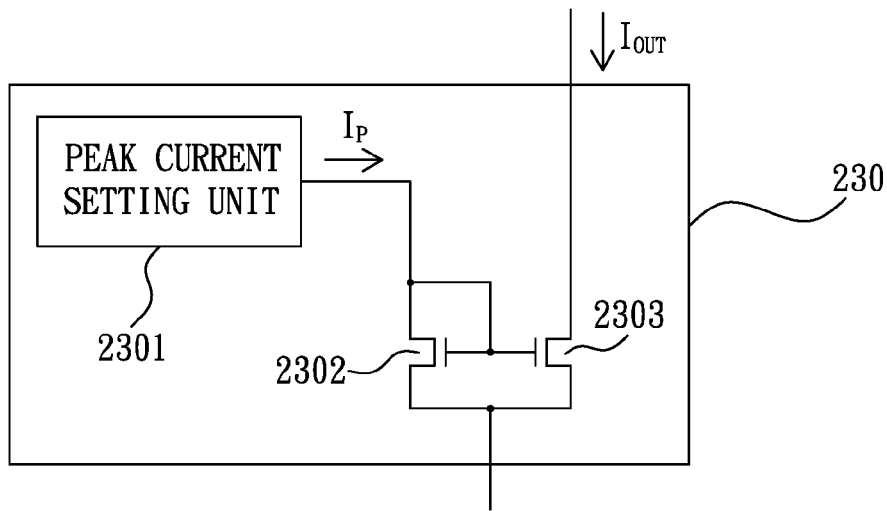
FIG. 4 illustrates a preferred embodiment of a peak current regulator of FIG. 2.

FIG. 4 illustrates a preferred embodiment of the peak current regulator 230 of FIG. 2. As illustrated in FIG. 4, the peak current regulator 230 includes a peak current setting unit 2301, a first NMOS transistor 2302, and a second NMOS transistor 2303.

The peak current setting unit 2301 has an output end to provide a clamping current $I_P$ for setting the second preset value.

The first NMOS transistor 2302 has a first gate, a first drain, and a first source. The first gate and first drain are coupled to the output end of the peak current setting unit 2301, and the first source is coupled to a current output node, wherein the current output node is used for the output current $I_{OUT}$ to flow out of the peak current regulator 230.

The second NMOS transistor 2303 has a second gate, a second drain, and a second source. The second gate is coupled to the first gate of the first NMOS transistor 2302, the second drain is coupled to a current input node, and the second source is coupled to the current output node, wherein the current input node is used for the output current $I_{OUT}$ to flow into the peak current regulator 230.

When the single stage PFC constant average current converter 220 allows a current value higher than the second preset value for the output current $I_{OUT}$ during a high voltage interval of the full-wave-rectified line input voltage $V_{IN}$, the second drain of the second NMOS transistor 2303 will exhibit a high impedance and the output current $I_{OUT}$ will be equal to the second preset value. When the single stage PFC constant average current converter 220 cannot allow a current value higher than the second preset value for the output current $I_{OUT}$ during a low voltage interval of the full-wave-rectified line input voltage $V_{IN}$, the second NMOS transistor 2303 will enter a triode region and the value of the output current $I_{OUT}$ will be determined by the single stage PFC constant average current converter 220, and a corresponding valley value of the output current $I_{OUT}$ will be automatically determined to make the average value of the output current $I_{OUT}$ equal to the first preset value.

Figure 5:
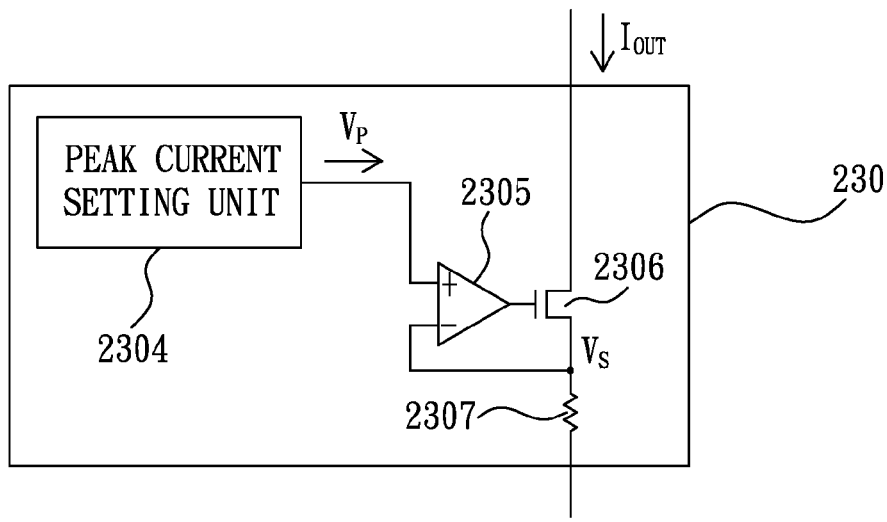
FIG. 5 illustrates another preferred embodiment of a peak current regulator of FIG. 2.

FIG. 5 illustrates another preferred embodiment of the peak current regulator 230 of FIG. 2. As illustrated in FIG. 5, the peak current regulator 230 includes a peak current setting unit 2304, an amplifier 2305, an NMOS transistor 2306, and a current sensing resistor 2307.

The peak current setting unit 2304 has an output end to provide a clamping voltage $V_P$ for setting the second preset value.

The amplifier 2305 has a positive input end, a negative input end, and an output end. The positive input end is coupled to the output end of the peak current setting unit 2304.

The NMOS transistor 2306 has a gate, a drain, and a source. The gate is coupled to the output end of the amplifier 2305, the drain is coupled to a current input node, and the source is coupled to the negative input end of the amplifier 2305, wherein the current input node is used for the output current $I_{OUT}$ to flow into the peak current regulator 230.

The current sensing resistor 2307 has one end coupled to the source of the NMOS transistor 2306, and another end coupled to a current output node, wherein the current output node is used for the output current $I_{OUT}$ to flow out of the peak current regulator 230.

When the single stage PFC constant average current converter 220 allows a current value higher than the second preset value for the output current $I_{OUT}$ during a high voltage interval of the full-wave-rectified line input voltage $V_{IN}$, the drain of the NMOS transistor 2306 will exhibit a high impedance and the output current $I_{OUT}$ will be equal to the second preset value determined by ($V_P$/the resistance of the current sensing resistor 2307). When the single stage PFC constant average current converter 220 cannot allow a current value higher than the second preset value for the output current $I_{OUT}$ during a low voltage interval of the full-wave-rectified line input voltage $V_{IN}$, the NMOS transistor 2306 will enter a triode region and the value of the output current $I_{OUT}$ will be determined by the single stage PFC constant average current converter 220, and a corresponding valley value of the output current $I_{OUT}$ will be automatically determined to make the average value of the output current $I_{OUT}$ equal to the first preset value.

Figure 6:
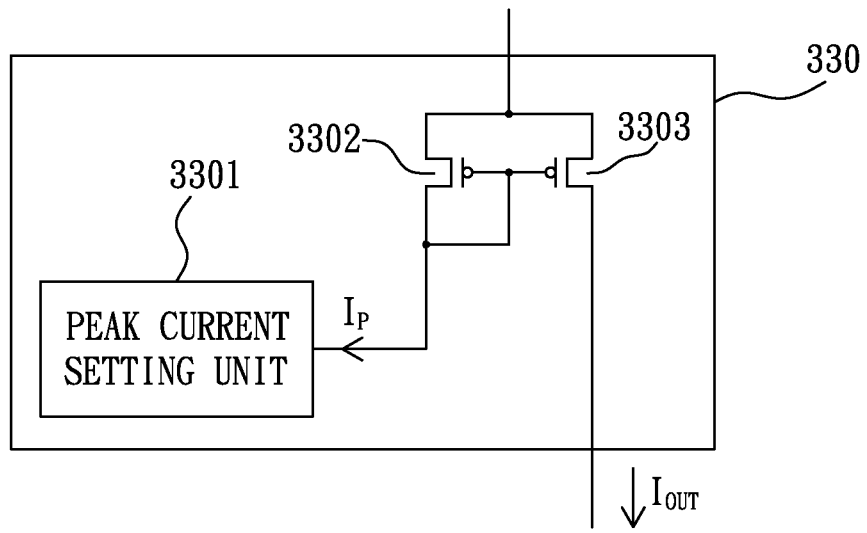
FIG. 6 illustrates a preferred embodiment of a peak current regulator of FIG. 3.

FIG. 6 illustrates a preferred embodiment of the peak current regulator 330 of FIG. 3. As illustrated in FIG. 6, the peak current regulator 330 includes a peak current setting unit 3301, a first PMOS transistor 3302, and a second PMOS transistor 3303.

The peak current setting unit 3301 has an output end to provide a clamping current $I_P$ for setting the second preset value.

The first PMOS transistor 3302 has a first gate, a first drain, and a first source. The first gate and first drain are coupled to the output end of the peak current setting unit 3301, and the first source is coupled to a current input node, wherein the current input node is used for the output current $I_{OUT}$ to flow into the peak current regulator 330.

The second PMOS transistor 3303 has a second gate, a second drain, and a second source. The second gate is coupled to the first gate of the first PMOS transistor 3302, the second drain is coupled to a current output node, and the second source is coupled to the current input node, wherein the current output node is used for the output current $I_{OUT}$ to flow out of the peak current regulator 330.

When the single stage PFC constant average current converter 320 allows a current value higher than the second preset value for the output current $I_{OUT}$ during a high voltage interval of the full-wave-rectified line input voltage $V_{IN}$, the second drain of the second PMOS transistor 3303 will exhibit a high impedance and the output current $I_{OUT}$ will be equal to the second preset value. When the single stage PFC constant average current converter 320 cannot allow a current value higher than the second preset value for the output current $I_{OUT}$ during a low voltage interval of the full-wave-rectified line input voltage $V_{IN}$, the second PMOS transistor 3303 will enter a triode region and the value of the output current $I_{OUT}$ will be determined by the single stage PFC constant average current converter 320, and a corresponding valley value of the output current $I_{OUT}$ will be automatically determined to make the average value of the output current $I_{OUT}$ equal to the first preset value.

Figure 7:
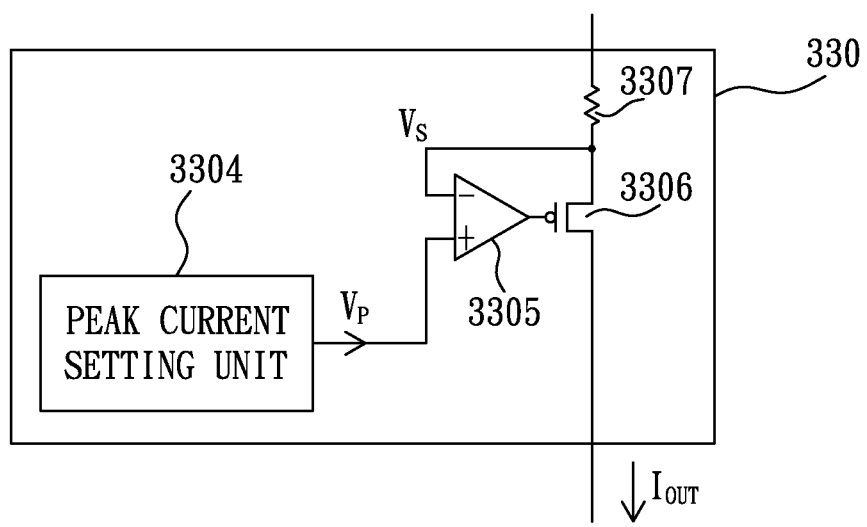
FIG. 7 illustrates another preferred embodiment of a peak current regulator of FIG. 3.

FIG. 7 illustrates another preferred embodiment of the peak current regulator 330 of FIG. 3. As illustrated in FIG. 7, the peak current regulator 330 includes a peak current setting unit 3304, an amplifier 3305, a PMOS transistor 3306, and a current sensing resistor 3307.

The peak current setting unit 3304 has an output end to provide a clamping voltage $V_P$ for setting the second preset value.

The amplifier 3305 has a positive input end, a negative input end, and an output end. The positive input end is coupled to the output end of the peak current setting unit 3304.

The PMOS transistor 3306 has a gate, a drain, and a source. The gate is coupled to the output end of the amplifier 3305, the drain is coupled to a current output node, and the source is coupled to the negative input end of the amplifier 3305, wherein the current output node is used for the output current $I_{OUT}$ to flow out of the peak current regulator 330.

The current sensing resistor 3307 has one end coupled to the source of the PMOS transistor 3306, and another end coupled to a current input node, wherein the current input node is used for the output current $I_{OUT}$ to flow into the peak current regulator 330.

When the single stage PFC constant average current converter 320 allows a current value higher than the second preset value for the output current $I_{OUT}$ during a high voltage interval of the full-wave-rectified line input voltage $V_{IN}$, the drain of the PMOS transistor 3306 will exhibit a high impedance and the output current $I_{OUT}$ will be equal to the second preset value determined by the clamping voltage $V_P$ and the resistance of the current sensing resistor 3307. When the single stage PFC constant average current converter 320 cannot allow a current value higher than the second preset value for the output current $I_{OUT}$ during a low voltage interval of the full-wave-rectified line input voltage $V_{IN}$, the PMOS transistor 3306 will enter a triode region and the value of the output current $I_{OUT}$ will be determined by the single stage PFC constant average current converter 320, and a corresponding valley value of the output current $I_{OUT}$ will be automatically determined to make the average value of the output current $I_{OUT}$ equal to the first preset value.

In conclusion, by virtue of the designs proposed above, the present invention possesses the advantages as follows:

1. The PFC LED driver of the present invention is capable of reducing the current ripple of LEDs to prevent a flicker phenomenon.

2. The PFC LED driver of the present invention is capable of reducing the current ripple of LEDs to improve the luminous efficiency without compromising the power factor.

3. The PFC LED driver of the present invention can be implemented with a low cost and a small size.

4. The PFC LED driver of the present invention is easy to design.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A PFC LED driver capable of reducing flicker, comprising:
a bridge rectifier, used to generate a full-wave-rectified line input voltage according to an AC power;
a single stage PFC constant average current converter, coupled with said bridge rectifier and used for forcing an input current to track said full-wave-rectified line input voltage and regulating an average value of an output current at a first preset value;
a peak current regulator, in series with an LED module to form a load for said output current to flow through and used for regulating a peak of said output current at a second preset value, said peak current regulator comprising:
a peak current setting unit, having an output end to provide a clamping current for setting said second preset value;
a first PMOS transistor, having a first gate, a first drain, and a first source, said first gate and first drain being coupled to said output end of said peak current setting unit, and said first source being coupled to a current input node, wherein said current input node is used for said output current to flow into said peak current regulator; and
a second PMOS transistor, having a second gate, a second drain, and a second source said second gate being coupled to said first gate of said first PMOS transistor, said second drain being coupled to a current output node, and said second source being coupled to said current input node, wherein said current output node is used for said output current to flow out of said peak current regulator.

2. The PFC LED driver capable of reducing flicker as disclosed in claim 1, wherein said single stage PFC constant average current converter is of a type selected from a group consisting of a buck type, a buck-boost type, and a fly-back type.

3. A PFC LED driver capable of reducing flicker, comprising:
   a bridge rectifier, used to generate a full-wave-rectified line input voltage according to an AC power;
   a single stage PFC constant average current converter, coupled with said bridge rectifier and used for forcing an input current to track said full-wave-rectified line input voltage and regulating an average value of an output current at a first preset value; and
   a peak current regulator, in series with an LED module to form a load for said output current to flow through and used for regulating a peak of said output current at a second preset value, said peak current regulator comprising:
   a peak current setting unit, having an output end to provide a clamping current for setting said second preset value;
   a first NMOS transistor, having a first gate, a first drain, and a first source, said first gate and first drain being coupled to said output end of said peak current setting unit, and said first source being coupled to a current output node, wherein said current output node is used for said output current to flow out of said peak current regulator; and
   a second NMOS transistor, having a second gate, a second drain, and a second source, the second gate being coupled to said first gate of said first NMOS transistor, said second drain being coupled to a current input node, and said second source is coupled to said current output node, wherein said current input node is used for said output current to flow into said peak current regulator.

4. The PFC LED driver capable of reducing flicker as disclosed in claim 3, wherein said single stage PFC constant average current converter is of a type selected from a group consisting of a buck type, a buck-boost type, and a fly-back type.

5. A PFC LED driver capable of reducing flicker, comprising:
   a bridge rectifier, used to generate a full-wave-rectified line input voltage according to an AC power;
   a single stage PFC constant average current converter, coupled with said bridge rectifier and used for forcing an input current to track said full-wave-rectified line input voltage and regulating an average value of an output current at a first preset value; and
   a peak current regulator, in series with an LED module to form a load for said output current to flow through and used for regulating a peak of said output current at a second preset value, said peak current regulator comprising:
   a peak current setting unit, having an output end to provide a clamping voltage for setting said second preset value;
   an amplifier, having a positive input end, a negative input end, and an output end, said positive input end being coupled to said output end of said peak current setting unit;
   an NMOS transistor, having a gate, a drain, and a source, said gate being coupled to said output end of said amplifier, said drain being coupled to a current input node, and said source being coupled to said negative input end of said amplifier, wherein said current input node is used for said output current to flow into said peak current regulator; and
   a current sensing resistor, having one end coupled to said source of said NMOS transistor, and another end coupled to a current output node, wherein said current output node is used for said output current to flow out of said peak current regulator.

6. The PFC LED driver capable of reducing flicker as claim 5, wherein said single stage PFC constant average current converter is of a type selected from a group consisting of a buck type, a buck-boost type, and a fly-back type.

* * * * *